Oct. 6, 1959     H. U. HJERMSTAD     2,907,249
LENS FOR SIGNAL LIGHTS
Filed Oct. 5, 1956
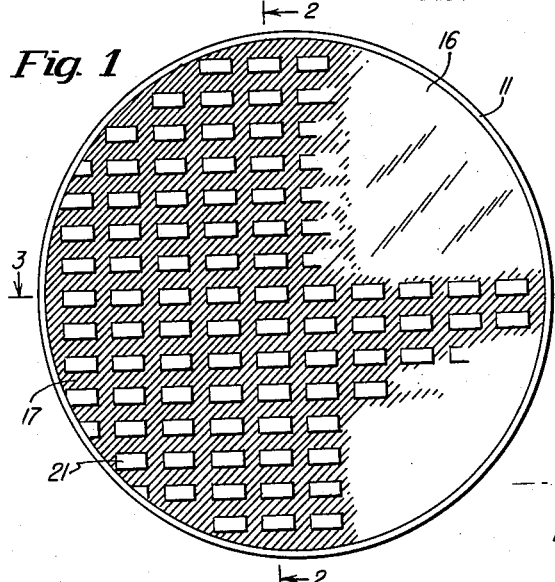
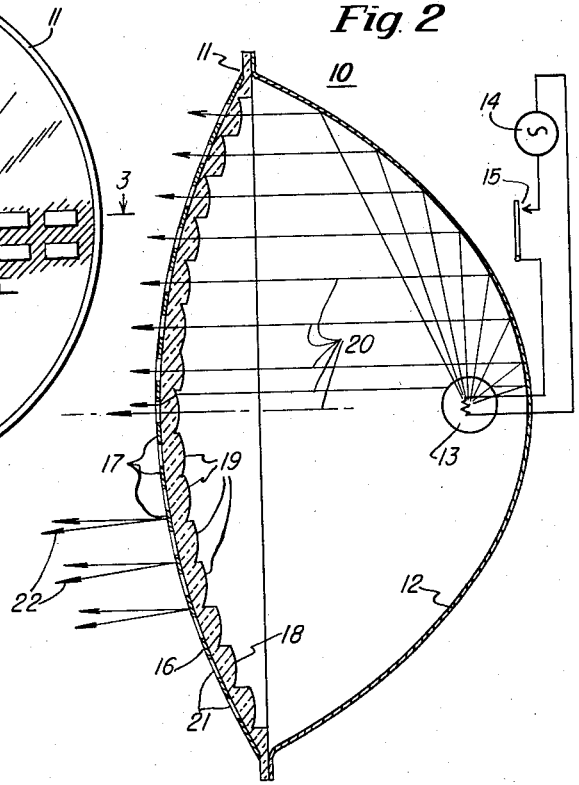
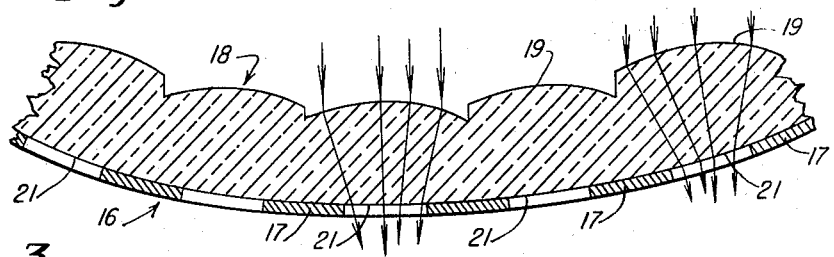
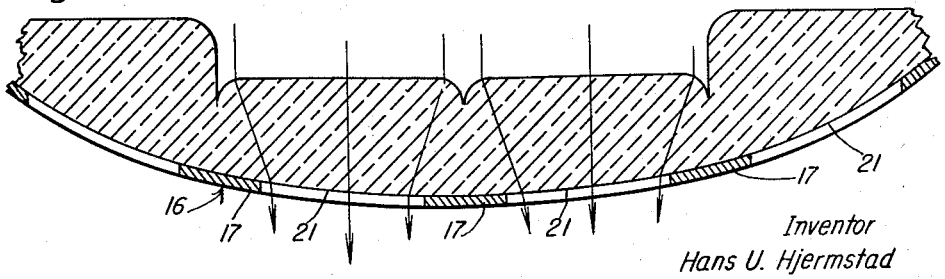
Inventor
Hans U. Hjermstad
Attys.

United States Patent Office 2,907,249
Patented Oct. 6, 1959

2,907,249

LENS FOR SIGNAL LIGHTS

Hans U. Hjermstad, Chicago, Ill., assignor to Electro-Seal Corporation, Des Plaines, Ill., a corporation of Illinois Application October 5, 1956, Serial No. 614,111

8 Claims. (Cl. 88—78)

The present invention relates to traffic control signals and particularly to light transmission lenses for the signal lights thereof.

In traffic control signals employing signal lights having colored lenses, one continuing and dangerous problem that arises in their use is that of "phantom signals," that is, the condition that occurs when a signal light which is not illuminated is made to appear illuminated by exterior light rays reflected from the light. The condition occurs most commonly in the early morning or late afternoon when sunlight falls directly on the lens of a signal light, is transmitted therethrough, and is reflected back through the lens to an observer so as to cause the signal light to appear illuminated. Though this phenomena is experienced most commonly in sunlight under the conditions described, it may be caused by other light sources as well. Irrespective of the light sources, the "phantom signals" produced constitute a continuous and serious threat to the safety of those depending upon traffic control provided by the signal lights, particularly where there are multiple signal lights such as "stop," "caution" and "go" lights as in the conventional traffic control systems.

Accordingly, it is a general object of the present invention to provide an improved lens for signal lights that prevents the occurrence of "phantom signals."

A more specific object of the invention is to provide an improved lens for a signal light which displays a signal indication when the signal light is illuminated and displays another distinctive appearance when the signal light is not illuminated.

A further object of the invention is to provide an improved lens for a signal light which displays a mirror-like appearance when the signal light is not illuminated and a signal indication when the signal light is illuminated.

Another object of the invention is to provide an improved lens for a signal light which carries on the one face thereof exposed to view a fragmentary mirror for displaying a mirror-like appearance when the signal light is not illuminated and for transmitting through the discontinuous portions of the mirror a signal indication when the signal light is illuminated.

Another object of the invention is to provide an improved lens for a signal light which carries on its outer exposed face a fragmentary mirror of uniform configuration and which is formed on its inner face with a plurality of optical surfaces cooperatively positioned with regard to the mirror portions carried on the outer face. The fragmentary mirror on the outer face of the lens is arranged to cause the signal light to display a mirror-like appearance when the light is not illuminated and the optical surfaces on the inner face are shaped and positioned with regard to the mirror portions so that when the light is illuminated, the light rays incident upon the inner face of the lens are collected and projected through the lens and the discontinuous portions of the mirror, thereby to render a signal indication of an intensity that is commensurate with the illumination provided by the signal light at the inner face of the lens and substantially undiminished by the fragmentary mirror portions on the outer face.

Further features of the invention pertain to the particular configuration of the improved lens for the signal light, whereby the above-outlined and additional operating features thereof are attained.

The invention both as to its organization and method of operation, together with further objects and advantages thereof, will be best understood by reference to the following specification taken in conjunction with the accompanying drawing, in which:

Figure 1 is a plan view of a signal light embodying the lens structure of the invention;

Fig. 2 is a vertical sectional-view taken on line 2—2 of Fig. 1;

Fig. 2A is a detailed vertical sectional-view of a portion of the lens structure of Fig. 2;

Fig. 3 is a detailed horizontal sectional-view of a portion of the lens structure taken along the line 3—3 of Fig. 1.

Referring to the drawings, there is shown in Figs. 1 and 2 an operatively controlled signal light 10, in accordance with the invention, including a colored light transmission lens 11, a reflector 12, a light source 13, and a lighting circuit including a source of potential 14 and a switch 15. The lens 11 carries on its exposed outer face 16 a fragmentary mirror 17, as is best shown in Fig. 1, and is formed on its inner face 18 of a plurality of optical surfaces 19, as is best shown in the cross-sectional view of Fig. 2. The reflector 12 is preferably a parabolic surface wherein the lighting element of the light source 13 is carried at the focus point thereof so that when the light source 13 illuminates in response to the switch 15 being closed, the light rays 20 emanated therefrom are reflected from the reflector 12 in a parallel pattern to form, in composite, a substantially undiffused light beam of uniform intensity which impinges upon the inner face 18 of the signal lens 11. The parallel light rays 20 impingent upon the face 18 of the lens 11 are refracted in the lens in accordance with the configuration of the optical surfaces 19 forming the inner face 18 of the lens 11 and are transmitted through the lens and projected from the outer face 16 at the areas 21, formed by the discontinuous portions of the fragmentary mirror 17, in a direction normally intercepted by a person viewing the signal light. When the light source 13 is not illuminated by the switch 15 being open, no light is projected from the areas 21 on the face 16 of the lens 11 but the fragmentary mirror 17 on the face 16 responds to the exterior light rays 22 incident upon the outer face 16 by reflecting the light rays from the face 16 in a direction towards the source thereof and in the direction normally intercepted by a person viewing the signal light, as shown in Fig. 2. Accordingly, the signal light presents to a person viewing the same a high intensity signal indication characterized by the particular color of the lens 11 when the signal light is illuminated from the interior and a mirror-like appearance characteristic of the exterior incident light rays as modulated by the color of the fragmentary mirror 17 when the signal light is not illuminated from the interior.

Considering now, in greater detail, the composition of the lens 11, the material of which the lens is made must be of high efficiency light transmission material and is conventionally of glass, but may also be plastic, and is of a color to provide a signal indication when illuminated. Further, the lens is conventionally of a substantially uniform thickness and is in the general shape of a spheric section, as shown in Fig. 2, though in fact neither of these conditions is critical to the practice of the present invention.

With regard to the configuration of the lens in accordance with the invention, and referring specifically to the detailed vertical cross-sectional view of Fig. 2A and the detailed horizontal cross-sectional view of Fig. 3, the optical surfaces 19 form, preferably though not necessarily, the entire surface of the inner face 18, are convex in shape, and are generally surfaces of revolution characterized as refracting light incident thereupon towards the centers of revolution and may, for example, take the specific form of a spheric, spheroidic, cylindric, conic, or toric lens sections. The optical surfaces 19 may be formed on the inner face so that the optical axis of each is perpendicular to the general spheric curvature of the lens but preferably, and as shown in Fig. 2, the optical surfaces 19 are formed on the inner face so that the optical axis of each is parallel to the longitudinal axis of the lens, whereby there is a greater concentration of the light refracted by the optical surfaces and projected through the exit areas 21.

Additionally, it may be desirable to modify the general shape of the convex optical surface chosen in a manner as shown in Fig. 3 wherein each of the optical surfaces 19 illustrated is of the general form of a cylindric curved at its extreme end portions to refract the light incident thereupon not only towards the center line of revolution (not shown) but also to refract the light incident on the curved end portions towards the lateral center of the center line of revolution. Accordingly, substantially all of the parallel light beams 20 directed towards the inner face 18 of the lens impinge upon the optical surfaces 19 and at each optical surface 19 the impinging light rays are refracted in the lens towards the geometric center of the optical surface; whereby substantially all of the light flux entered upon the inner face 18 is collected at the optical surfaces 19, concentrated by refraction within the lens and projected from the outer face 16 of the lens at areas 21 corresponding to each of the optical surfaces 19, in a manner as determined by the radius of curvature of the selected optical surface 19, the index refraction of the lens material and the thickness of the lens. At the areas 21 the light projected therefrom is again refracted into the viewing area.

The fragmentary mirror 17 carried on the outer, or front, face 16 of the lens 11 is discontinuous at the projection areas 21 on the outer face and is comprised, in fact, of a plurality of reflective islands positioned exterior to the projection areas 21 or, as shown in Fig. 1, of a plurality of intersecting bands of reflective material positioned between the projection areas 21. The particular configuration chosen for the fragmentary mirror is determined essentially by the configuration taken by the projection areas 21 and as the projection areas 21 form a pattern on the outer face, the fragmentary mirror 17 forms a complementary pattern covering the non-projection areas of the outer face 16. The reflective material forming the fragmentary mirror may be of any number of reflective materials in common use, such as aluminum, stainless steel, chromium, silver, copper, gold, etc., and may be applied to the surface of the face 16 by electro-plating or chemical deposition, or by painting by means of a brush or spray, sputtering, or evaporating through a screen. The reflective material so applied may be of a thickness so as to permit transmission therethrough of the light normally diffused in the lens and thereby add to the brilliance of the signal indication when the signal light is illuminated, or the reflected material may be of a thickness so as to render the covered areas of the face 16 substantially opaque. At the present time the latter arrangement is preferred for reasons of production control and because the intensity of the diffused light available in the lens for transmission through the reflective coatings is slight as compared to the intensity of the light projected from the areas 21 and when transmitted through a thin film of the reflective material adds only imperceptibly to the brilliance of the signal indication. An additional advantage to making the fragmentary mirror opaque is that any exterior light incident upon the outer face 16 of the lens and entered into the signal light through the exist areas 21 and reflected therein is prevented by the opaqueness of the mirror from rendering a "phantom signal" display as to that area of the lens covered by the fragmentary mirror.

The surfaces of the projection areas 21 on the face 16 of the lens may conform to the general curvature of the lens face whereby the light rays projected from the areas 21 are substantially diffused. This arrangement is considered to be preferred inasmuch as the light rays projected therefrom provides a brilliant display to a person viewing the light at a position in alignment with the light and remote therefrom and also provide a clear display to a person viewing the light at a position oblique to the light and in close proximity thereto so that the signal light is well suited for directing automotive traffic as well as pedestrian traffic.

Alternatively, the surface of each of the projection areas 21 may be convex in shape and either protruded from or recessed in the lens face whereby the light rays projected from the areas 21 are further diffused to provide a display of greater brilliance to persons viewing the signal light at a position oblique to the light and in close proximity thereto and without destroying the effectiveness of the signal for directing the normally more remotely positioned automotive traffic. The convex shape of the projection areas may be spheric, spheroidic, etc., as previously outlined, depending upon the diffusion pattern desired and considered to be most appropriate for the use intended.

Additionally, the surface of each of the projection areas 21 may be concave in shape and either recessed in the lens face or positioned flush with the curvature thereof whereby the light rays projected from the areas 21 are refracted towards the center of revolution thereof and are concentrated to provide a display of greater brilliance to persons viewing the signal light at a position in alignment therewith and remote therefrom and without destroying the effectiveness of the signal for directing the normally more closely and obliquely positioned pedestrian traffic. The concave shape of the projection areas 21 may be spheric, spherodic, etc., as previously outlined, depending upon the concentration pattern desired. For example, assuming that the optical surfaces 19 are modified toric sections for which the optical axes are parallel to the longitudinal axis of the lens, as shown in Figs. 2A and 3, should it be desired to provide a substantially parallel array of projected light beams such as would be suitable for use in railway or highway traffic control the projection areas 21 may be concave surfaces of revolution substantially identical in form to those of the optical surfaces 19, that is, modified toric sections, having the same centers of revolution and having optical axes common to those of the corresponding optical surfaces 19.

With regards to the relative areas occupied by the fragmentary mirror 17 and the projection areas 21 on the outer face 16 of the lens 11, it is to be appreciated that the arrangements of the areas shown in the drawings is meant to be schematic for the purpose of more easily illustrating the invention. Though the range of effective relative areas is quite broad, it has been determined that the most efficient transmission and reflection results are obtained if the fragmentary mirror comprises approximately 40% of the surface area of the face 16. Additionally, it is preferable that the projection areas be closely spaced so as to present the appearance of a continuous light source to an observer at a critical signal distance. Specifically, and assuming that a viewing position 50 feet from the signal light is considered to be a critical signal distance, the human eye has a resolving power of approximately one part in 3,438 so that to a viewer at the distance of 50 feet from a signal light the projection areas will be unresolved and the lens will appear uniformly illuminated when the projection areas are spaced no further apart than 3/16 of an inch, which means that the band of reflective materials shown in Fig. 1 going to make up the fragmentary mirror 17 should be no wider than 3/16 of an inch.

In view of the foregoing, it is apparent that there has been provided a lens for a signal light of improved construction and arrangement so that when the signal light is illuminated a high intensity signal indication is provided to a viewer of the signal light, and when the signal light is not illuminated a distinctive mirror-light appearance is presented to a viewer of the signal light.

While there has been described what is at present considered to be preferred embodiment of the invention, it will be understood that various modifications may be made therein, and it is intended to cover in the appended claims all such modifications as fall within the true spirit and scope of the invention.

What is claimed is:

1. A light transmission optic for an operatively controlled signal light comprising a single element lens of light-transmitting material having a back face and a front face and being formed on the back face thereof in a plurality of optical surfaces and carrying on the front face thereof a fragmentary mirror, each of said optical surfaces having an individually associated optical axis and being shaped so as to refract light incident upon the surface thereof and converge said refracted light towards said optical axis, said fragmentary mirror consisting essentially of a layer of reflective material having therein a plurality of discontinuities corresponding to said optical surfaces whereof said discontinuities are centered with regard to said optical axes, said lens being characterized by the transmission of substantially all of the light incident upon the back face thereof and by the reflection of a substantial portion of the light incident upon the front face thereof, so that said lens when positioned in a signal light with the front face exposed to view presents to a person viewing the same a mirror-like appearance when the signal light is not illuminated and a signal indication when the signal light is illuminated.

2. A light transmission optic for an operatively controlled signal light comprising a single element lens of light-transmitting material having a back face and a front face and being formed on the back face thereof in a plurality of symmetric optical surfaces and carrying on the front face thereof a fragmentary mirror, each of said optical surfaces having an individually associated optical axis and being shaped so as to refract light entering upon the area of the surface thereof towards said optical axis and to project said refracted light through the front face of said lens at a corresponding exit area that is small as compared to the entrance area, said fragmentary mirror consisting essentially of an apertured layer of reflective material arranged on the front face of said lens with the apertures in said layer coincident with said exit areas, said lens being characterized by the transmission of substantially all of the light incident upon the back face thereof and by the reflection of a substantial portion of the light incident upon the front face thereof, so that said lens when positioned in a signal light with the front face exposed to view presents to a person viewing the same a mirror-like appearance when the signal light is not illuminated and a signal indication when the signal light is illuminated.

3. A light transmission optic for an operatively controlled signal light comprising a single element spherical section lens of light-transmitting material having an inner face and an outer face and being formed on the faces thereof in a plurality of optical surfaces and carrying on the outer face thereof a fragmentary mirror, each of the optical surfaces on said inner face having an individually associated optical axis and being a convex surface of revolution shaped so as to refract light entering upon the area of the surface thereof towards said optical axis and to project said refracted light through the outer face of said lens at a corresponding exit area that is small as compared to the entrance area, each of the optical surfaces on said outer face corresponding to a one of said optical surfaces on said inner face and being laterally coextensive with the corresponding exit area, said fragmentary mirror being composed of a layer of reflective material covering only that area of said outer face lying between said optical surfaces thereon, said lens being characterized by the transmission of substantially all of the light incident upon the inner face thereof and by the reflection of a substantial portion of the light incident upon the outer face thereof, so that said lens when positioned in a signal light with the outer face exposed to view presents to a person viewing the same a mirror-like appearance when the signal light is not illuminated and a signal indication when the signal light is illuminated.

4. The light transmission optic set forth in claim 3 wherein each of the optical surfaces on said outer face conform to the spheric curvature of the outer face of said lens.

5. A light transmission optic for an operatively controlled signal light comprising a single element spherical section lens of light-transmitting material having an inner face and an outer face, said lens at said inner face being formed over substantially the entire area thereof in a plurality of first optical surfaces each having an optical axis associated therewith, each of said first optical surfaces being a convex surface of revolution shaped so as to refract light entering upon the area of the surface thereof towards said optical axis and to project said refracted light through the outer face of said lens at an exit area that is small as compared to the entrance area, said lens at said outer face being formed at the exit areas thereon in a corresponding plurality of second optical surfaces and being formed over that area thereof between said second optical surfaces in a fragmentary mirror, whereby said lens is characterized by the transmission at the second optical surfaces on said outer face of substantially all of the light incident upon the inner face thereof and by the reflection at said fragmentary mirror on said outer face of a substantial portion of the light incident upon the outer face thereof, so that said lens when positioned in a signal light with the outer face exposed to view presents to a person viewing the same a mirror-like appearance when the signal light is not illuminated and a signal indication when the signal light is illuminated.

6. The light transmission optic set forth in claim 5 wherein said fragmentary mirror consists essentially of an opaque layer of reflective material so that substantially all of the light incident upon said fragmentary mirror is reflected therefrom.

7. The light transmission optic set forth in claim 5 wherein said fragmentary mirror constitutes essentially of a translucent layer of reflective material so as to reflect a portion of the light incident on the fragmentary mirror and so as to transmit therethrough a portion of the light normally diffused in the lens thereof when the signal light is illuminated.

8. A light transmission optic for an operatively controlled signal light comprising a single element spherical section lens of light-transmitting material having an inner face and an outer face, said lens at said inner face being formed over substantially the entire area thereof in a plurality of first optical surfaces each having an optical axis associated therewith parallel to the longitudinal axis of said lens, each of said first optical surfaces being a convex surface of revolution shaped so as to refract light entering upon the area of the surface thereof towards said optical axis and to project said refracted light through the outer face of said lens at an exit area that is small as compared to said area upon which said refracted light enters, said lens at said outer face being formed at the exit areas thereon in a corresponding plurality of second optical surfaces and being formed over that area thereof between said second optical surfaces in a fragmentary mirror, each of said second optical surfaces conforming to the spheric curvature of the outer face of said lens, and said fragmentary mirror consisting essentially of an opaque layer of reflective material, whereby said lens is characterized by the transmission at the second optical surfaces on said outer face of substantially all of the light incident upon the inner face thereof and by the reflection at said fragmentary mirror on said outer face of a substantial portion of the light incident upon the outer face thereof, so that said lens when positioned in a signal light with the outer face exposed to view presents to a person viewing the same a mirror-like appearance when the signal light is not illuminated and a signal indication when the signal light is illuminated.

References Cited in the file of this patent

UNITED STATES PATENTS

| | | |
|---|---|---|
| 586,799 | Nerz | July 20, 1897 |
| 1,824,353 | Jensen | Sept. 22, 1931 |
| 1,890,893 | Andres | Dec. 13, 1932 |
| 1,942,841 | Shimizu | Jan. 9, 1934 |
| 2,141,159 | Bergstrom | Dec. 27, 1938 |
| 2,144,096 | Trautner | Jan. 17, 1939 |
| 2,197,226 | Smith | Apr. 16, 1940 |
| 2,286,201 | Farrand et al. | June 16, 1942 |
| 2,292,152 | Newcomer | Aug. 4, 1942 |

FOREIGN PATENTS

| | | |
|---|---|---|
| 11,054 | Great Britain | of 1908 |
| 215,086 | Great Britain | May 1, 1924 |